No. 892,183. PATENTED JUNE 30, 1908.
J. H. RAND.
TOOL FOR SETTING PUNCTURE CLOSURES.
APPLICATION FILED JAN. 28, 1908.
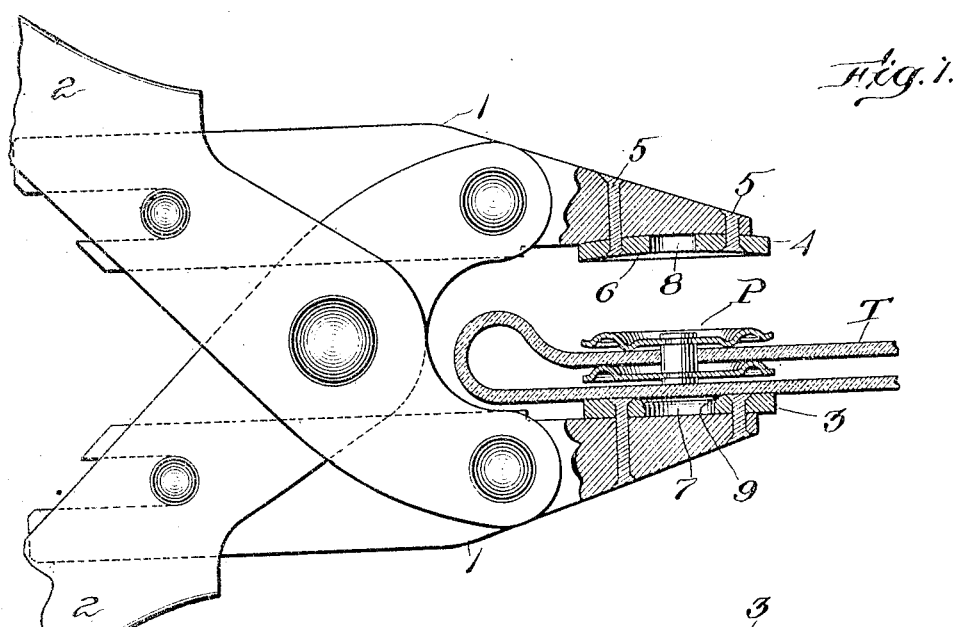
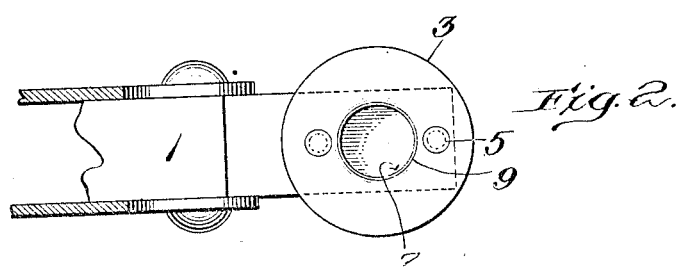
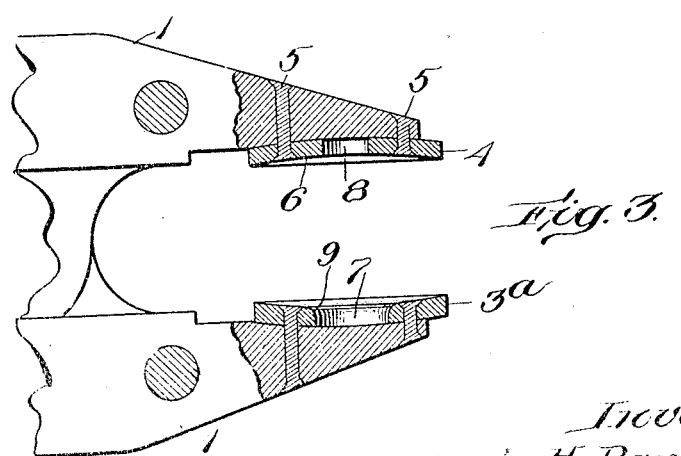
Witnesses:
Charles D. Woodberry
Josephine H. Ryan
Inventor:
James H. Rand,
by Roberts, Roberts & Cushman
Attys.

UNITED STATES PATENT OFFICE.

JAMES H. RAND, OF NEWTON, MASSACHUSETTS.

TOOL FOR SETTING PUNCTURE-CLOSURES.

No. 892,183.  Specification of Letters Patent.  Patented June 30, 1908.

Application filed January 28, 1908. Serial No. 413,081.

*To all whom it may concern:*

Be it known that I, JAMES H. RAND, a citizen of the United States, and resident of Newton, in the county of Middlesex and State of Massachusetts, have invented new and useful Improvements in Tools for Setting Puncture-Closures, of which the following is a specification.

My invention relates to a tool especially adapted for setting a puncture closer for pneumatic tires of the character set forth in a concurrent application for patent filed by me October 21, 1907, Serial No. 398,372.

The puncture closer consists essentially in a pair of opposed head-plates rigidly connected by a stiff post and adapted to be bent toward each other to grip the material to be mended along the peripheries of the plates.

For a more detailed description of the construction and mode of operation of said puncture closer reference is made to said application for patent.

The present invention consists in the novel construction of the pincers for setting such puncture closers as hereinafter fully described and pointed out in the claims.

Referring to the accompanying drawings which illustrate certain embodiments of my invention,—Figure 1 is a side view, partly in section, of a pair of pincers containing my invention, and illustrating the method of using them in setting a puncture closer; Fig. 2 is a plan view of one of the clamping surfaces of the jaws; and Fig. 3 is a sectional view of a modified form of the clamping surfaces.

Any suitable form of pincers having relatively movable jaws may be employed, preferably pincers whose jaws maintain parallel relation with each other at all times. I have illustrated a well known form of such pincers having the parallel jaw members 1, 1, operated by handles 2, 2.

The present invention is concerned primarily with the operative or clamping surfaces of the jaws.

In the form of the invention shown in the drawings, a pair of disks 3 and 4 are firmly secured to the opposed faces of the jaw members 1, 1, in any suitable manner, as by rivets 5, 5. One of said disks, for example disk 3, is flat and the other disk, 4, is concave on its operative surface, as shown at 6; or, if desired, both surfaces may be concave as shown in Fig. 3. To receive the ends of the rigid post of the puncture closer when it is being set and the jaw surfaces have to approach nearer together than the length of the post, a central recess or perforation is provided in each disk as shown at 7 and 8. One of the said recesses, preferably 7 in the flat disk 3, is larger than the other and is provided with a rounded or beveled edge 9, the purpose of which will presently appear.

The operation of the device is as follows: One head-plate of the puncture closer or plug P is passed through the hole to be sealed in the tire T (the hole stretched for that purpose), the parts assuming the position shown in Fig. 1. The tire T, together with the puncture closer P in the position shown, are then placed between the jaws of the tool, the concave surface 6 bearing, directly against the upper plate of the puncture closer, and the flat jaw surface bearing against the lower plate of the puncture closer through one thickness of the tire. The central post of the puncture closer registers with the recesses 7 and 8 of the gripping surfaces. The operator then grips the handles of the pincers closing the jaws together. The concave jaw surface 6, coöperating with its opposed jaw surface, bends the upper head plate of the plug along the periphery, clamping between it and the lower head plate the material of the tire in a line around the hole to be sealed. The recesses in the clamping faces of the jaws provide a clearance to permit the ends of the posts to enter to allow the jaws to be pressed together close enough to make a tight seal between the head plates. Inasmuch as one thickness of the tire has to lie between one of the jaws and the plug, I provide the recess on that side with a rounded or beveled edge, as shown at 9, to prevent the cutting of the tire which might occur if the edge were left sharp and the recess on the same jaw is preferably made larger than the other, which need be only large enough to accommodate the end of the post, in order further to obviate the danger of damaging the tire by pressure or crushing immediately around the post, and to permit the lower head plate to be deflected slightly at its center into the recess 7 whereby the post will not project unduly on the outer side of the tire.

I claim:

1. A tool for setting a puncture closer of the character described having a stiff central post and a pair of head plates to be flexed into gripping relation with each other, comprising a pair of relatively movable jaws, one at least of said jaws having a concave clamping surface adapted to bend the periphery of one of the head plates of the puncture closer toward the other, and one at least of said jaws having a recess in its clamping surface adapted to receive the end of the post of the puncture closer, as the jaws approach each other to clamp the head plates.

2. A tool for setting a puncture closer of the character described having a stiff central post and a pair of head plates to be flexed into gripping relation with each other, comprising a pair of relatively movable jaws, one at least of said jaws having a concave clamping surface adapted to bend the periphery of one of the head plates of the puncture closer toward the other, each jaw having a recess in its clamping surface adapted to receive the end of the post of the puncture closer as the jaws approach each other to clamp the head plates.

3. A tool for setting a puncture closer of the character described having a stiff central post and a pair of head plates to be flexed into gripping relation with each other, comprising a pair of relatively movable jaws, one at least of said jaws having a concave clamping surface adapted to bend the periphery of one of the head plates of the puncture closer toward the other, each jaw having a recess in its clamping surface adapted to receive the end of the post of the puncture closer as the jaws approach each other to clamp the head plates, and one of said recesses having a rounded or beveled edge.

4. A tool for setting a puncture closer of the character described having a stiff central post and a pair of head plates to be flexed into gripping relation with each other, comprising a pair of relatively movable jaws, one at least of said jaws having a concave clamping surface adapted to bend the periphery of one of the head plates of the puncture closer toward the other, each jaw having a recess in its clamping surface adapted to receive the end of the post of the puncture closer as the jaws approach each other to clamp the head plates, and one of said recesses being of larger diameter than the other.

Signed by me at Boston, Massachusetts this 27th day of January 1908.

JAMES H. RAND.

Witnesses:
ROBERT CUSHMAN,
CHARLES D. WOODBERRY.